Sept. 22, 1959  H. B. CANNON  2,905,322
METHOD AND APPARATUS FOR SEPARATING AND CONCENTRATING
REAGENTIZED GRANULAR MIXTURES
Filed Sept. 27, 1956  2 Sheets-Sheet 1
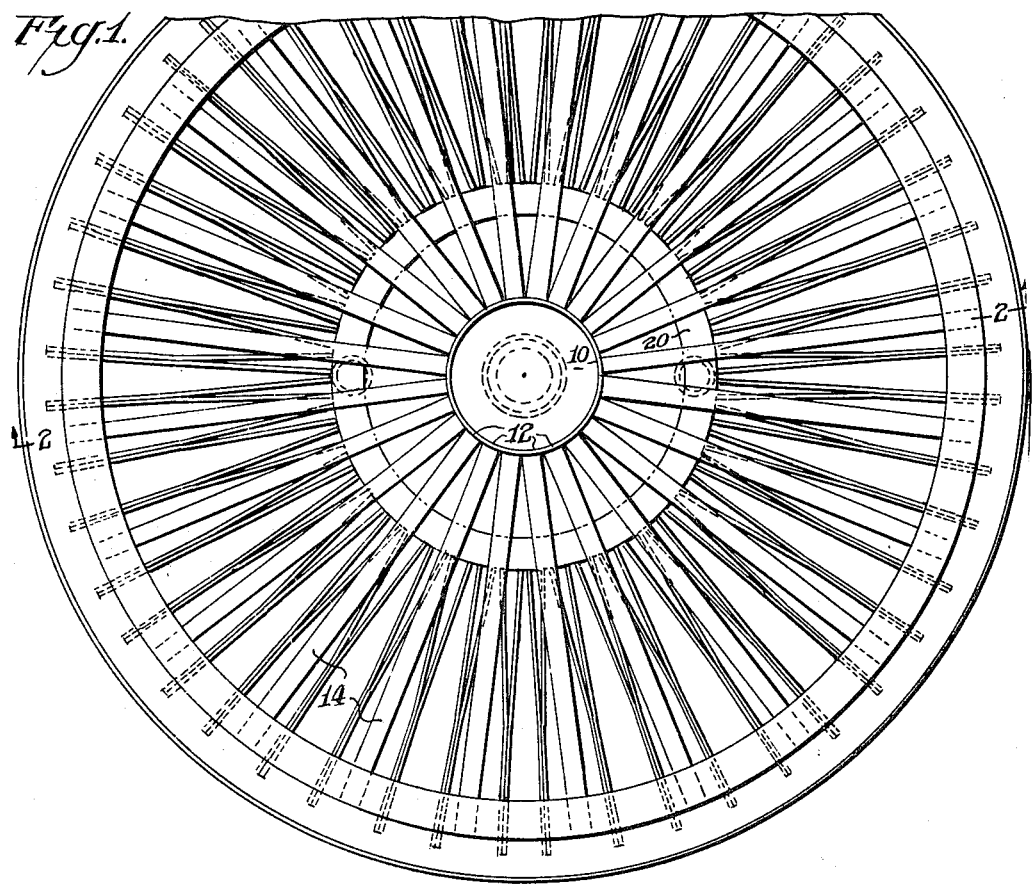
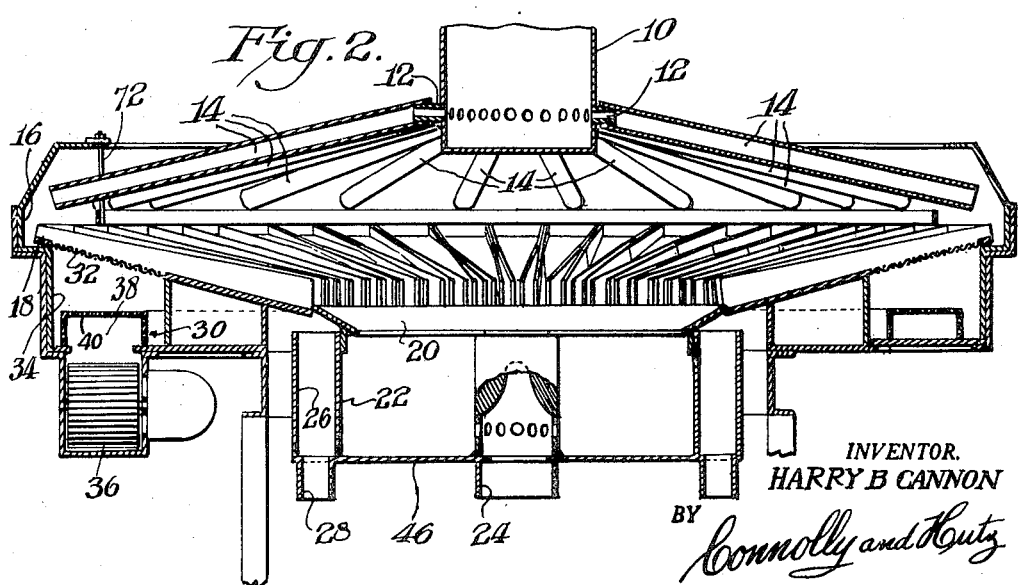
INVENTOR.
HARRY B CANNON
BY
Connolly and Hutz
HIS ATTORNEYS

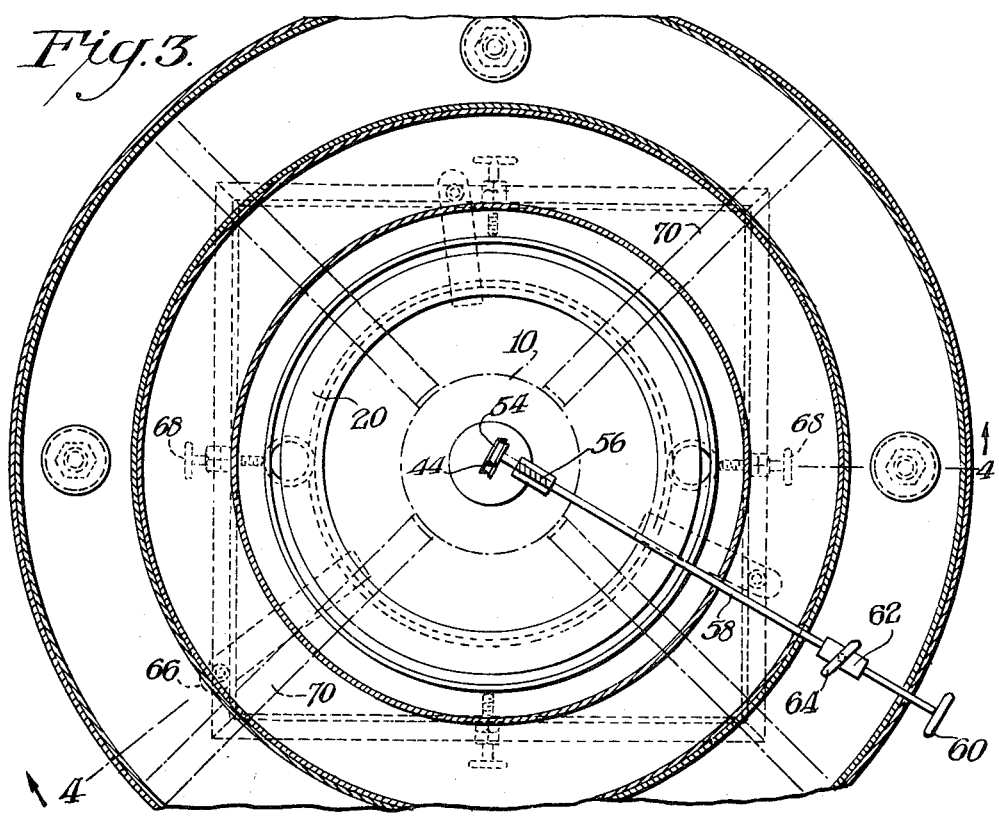
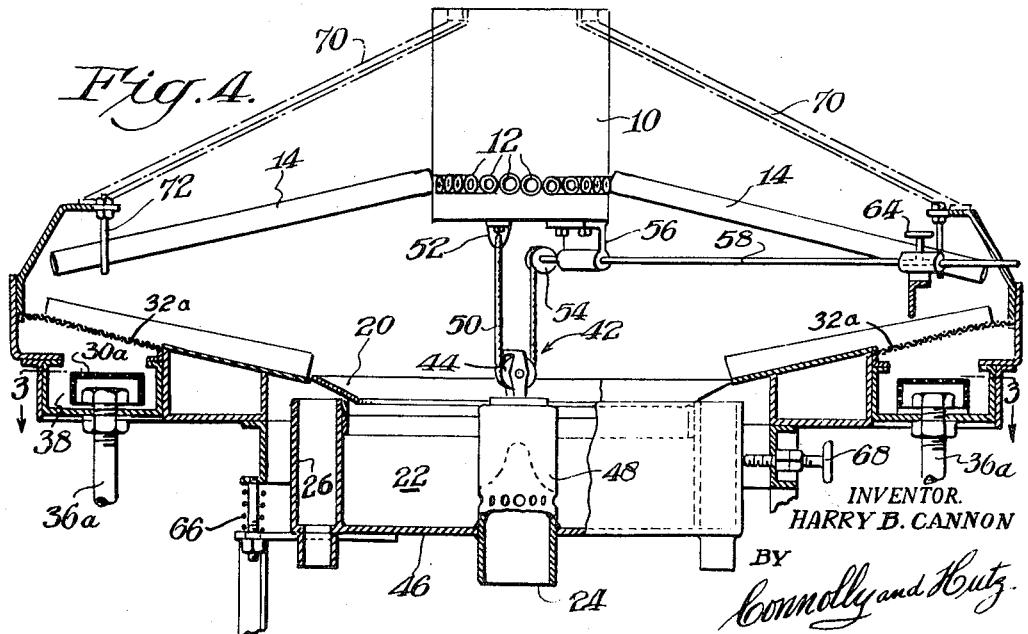

United States Patent Office 2,905,322
Patented Sept. 22, 1959

2,905,322

METHOD AND APPARATUS FOR SEPARATING AND CONCENTRATING REAGENTIZED GRANULAR MIXTURES

Harry B. Cannon, Lakeland, Fla.

Application September 27, 1956, Serial No. 612,499

6 Claims. (Cl. 209—170)

This invention relates to a novel method and apparatus for separating a granular mixture into its constituent components, and more particularly to a novel method and apparatus for separating a reagentized granular mixture.

Applicant has disclosed and claimed in prior copending applications a novel method and apparatus for separating any type of granular mixture into its constituent components. This method includes the steps of dispersing a mixture of these components in a liquid slurry guiding the slurry in a downwardly sloping and converging stream of increasing depth under tranquil laminar conditions of open channel type flow without sandbarring, while substantially increasing its velocity to segregate the constituents into strata within the stream and then discharging the stratified slurry in a freely falling stream which is divided by a splitter in accordance with the stratification. This novel method and a novel apparatus for carrying out its steps are disclosed and claimed in copending application Ser. No. 297,952 filed July 9, 1952 and issued as U.S. Letters Patent No. 2,766,882 on October 16, 1956. A novel apparatus for performing this novel separating process is also disclosed in copending application Ser. No. 469,414 filed November 17, 1954 and issued as U.S. Letters Patent No. 2,769,545 on November 6, 1956.

Applicant has discovered that a reagentized granular mixture of lighter valuable granular particles or minerals having very little gravity differential from their gangue constituents may be unexpectedly more efficiently separated by means of the aforementioned novel method and apparatus when an additional novel step is provided and the apparatus is accordingly modified.

An object of this invention is to provide a novel separating method and apparatus which greatly facilitates the separation of reagentized granular mixtures.

In accordance with this invention, a reagentized granular mixture is dispersed in a liquid slurry. A gaseous fluid, air for example, is bubbled through the slurry. The slurry is then subjected to the steps of the aforementioned novel separating method which include guiding of the slurry in a downwardly sloping and converging stream of increasing depth under tranquil laminar conditions of open channel type flow without sandbarring while substantially increasing its velocity to segregate its constitutents into strata, and this stratified slurry is discharged in a freely falling stream which is separated in accordance with its stratification by a splitter. Effective separation is accomplished with surprisingly little travel of the slurry down the open channel.

Novel features and advantages of the present invention will become apparent to one skilled in the art from a reading of the following description in conjunction with the accompanying drawings in which similar reference characters refer to similar parts and which:

Fig. 1 is a plan view of an embodiment of this invention;

Fig. 2 is a cross-sectional view in elevation taken through Fig. 1 along line 2—2;

Fig. 3 is a plan view of portions of the embodiment shown in Fig. 1; and

Fig. 4 is a cross-sectional view in elevation taken through Fig. 3 along the line 4—4.

In separating and concentrating certain lighter mineral ores such as phosphates, potash and similar light minerals having little gravity differential from their gangue constituents, it is desirable to treat the feed with flotation reagents in order to influence stratification of the various solid constituents. In these lighter mixtures, the upper floating portion or strata usually contains the valuable mineral concentrates. The various reagents for treating these lighter mixtures are well known in the art, such as a combination of oleic acid and fuel oil for an initial rough separation of phosphates and an amine for a final separation. Before the reagentized mixture is guided in open channel flow, it is dispersed in a liquid, water, for example. Slurry densities which have been found to be particularly effective range from between 15% to 40% solid matter. A slurry density in excess of the upper limit reduces the purity of the recovered concentrate.

A novel apparatus for carrying out the steps of this novel separating method is described in the drawing. Referring to Figs. 1 and 2, a reagentized granular slurry is supplied to a feed cylinder 10 which includes a number of outlets 12 which encircle the lower portion of supply tank 10. Feed tubes 14 are radially connected to outlets 12 of supply tank 10 and conduct the slurry from outlets 12 to an annular trough 16. Convergent troughs 18 are radially disposed like the spokes of a wheel with their wider ends communicating with annular trough 16 and their narrower ends disposed in a smaller circular array. Tubes 14 and annular trough 16 feed the slurry to convergent troughs 18 under atmospheric pressure tranquil laminar conditions of flow. These troughs 18 accordingly conduct the slurry inwardly from the outer annular channel to discharge it from a smaller inner circle. The slurry is stratified during its passage down the troughs in a manner later described in detail. Troughs 18 are sloped downward from inlet to outlet and have raised sidewalls which converge, and have unique characteristics which provide highly efficient separation for reagentized mixtures as is later described in detail.

A splitter element or ring 20 is disposed in close proximity to the outlets of troughs 20 to split the discharged slurry into its constituent components. The edge of the splitter is placed, for example, from ⅛" to ¼" away from the outlets of the troughs to provide effective splitting action. Slurry passing over the upper edge of the splitter 20 passes into an inner chamber 22 from which it is discharged by means of a centrally placed outlet conduit 24. Slurry passing under the edge of splitter 20 passes into an outer annular chamber 26 from which it is discharged by several outlets 28. Inner chamber 22 contains the floatable and usually more valuable concentrate.

The portion of this apparatus which distinguished it over former arrangements disclosed and claimed by applicant, as well as any other separators heretofore known, is a means 30 for bubbling a gaseous fluid, such as air, through the reagentized slurry as it starts to flow down trough 18. Air bubbling means 30 includes a foraminous bottom wall 32 for the inlet portion of trough 18. This foraminous or perforated bottom wall is made of finely perforated materials, canvas, for example. A fine mesh screen, porous plastic or other finely perforated materials may be used. This air bubbling means may be provided immediately before the slurry passes to the inlet of the trough or may be incorporated in the inlet section of the trough itself, as herein shown.

A plenum chamber 34 is connected to perforated wall 32 of each of troughs 18 to provide a supply of air to be bubbled through the slurry. Air supply means 36 are connected to the plenum chamber 34 through a discharge chamber 38. Discharge chamber 38 is perforated to supply an even flow of air to each of the troughs regardless of proximity or remoteness from the air supply means. Air discharge means 38 is, for example, a perforated channel 40 connected to one point thereof to air supply means 36, a centrifugal blower, for example.

Referring to Figs. 3 and 4, details of the separating structure are described which permit adjustment of components to provide optimum separating conditions. Splitter 20 and collecting chambers 22 and 26 are supported from the bottom of tank 10, for example, by means of an adjustable pulley and cable arrangement 42. Pulley 44 is secured to bottom wall 46 of separating chamber 22 by means of a boss 48. The lower portion of the boss 48 is perforated to allow passage of the concentrate from the front chamber 22 through outlet 24 which may be formed as one piece with boss 48. Cable 50 suspending pulley 44 from the bottom of tank 10 is anchored to the bottom of tank 10 by means of a bracket 52 and a take-up reel 54 which is rotatably anchored to the tank 10 by means of a bearing bracket 56. Take-up reel 54 is manipulated by means of an elongated rod 58 and connected handwheel 60, which is rotated to raise or lower splitter 20. A bearing 62 and locking screw 64 support and lock shaft 58 at the outer periphery of the separator. Springs 66 are provided about outer portions of the bottom wall of a collecting tank arrangement 22 and 24 to positively exert a downward force on the splitter assembly to lower the collecting chambers and splitter 20 when pulley 44 is lowered.

Fig. 4 shows an alternative air supply means 36a such as compressed air piping for example, which is connected to distributing chamber 38 at various points around the circumference around plenum chamber 30a. This provides an even distribution of air flowing through each segment. Fig. 4 also shows a set of braces 70 for supporting tank 10. Slings 72 are also provided for supporting the lower ends of distributing tubes 14. A modification of air bubbling means 30a is also shown in Fig. 4 where the perforated wall 32a extends beyond the inlet of the trough to bubble air through the slurry immediately before it enters the trough.

Troughs 18 having certain physical characteristics have been found to yield excellent results. These characteristics are enumerated in the following: outlets from 3/8" to 1" in width; slope of the bottom wall between 9° to 14°; and the convergence of the side walls between 6° and 16°. A trough having these aforementioned characteristics separates a reagentized slurry into its constituent components in an unexpectedly short travel of from 6" to 12", for example.

Operation

An ore mixture containing phosphate and associated waste sands including quartz, for example, is first treated with a reagent, such as a mixture of oleic acid and fuel oil. This reagentized mixture is then continuously fed into a flowing stream of water to form a slurry. As this slurry is guided in open channel flow in a downwardly sloping and converging stream of increasing depth under tranquil laminar conditions without sandbarring, it substantially increases its velocity of flow from inlet to outlet and segregates its constituents into strata. The floatable components form the upper strata and the wettable granules form the lower strata. A demarcation zone of clear water is formed between the upper valuable layer and the lower waste strata. The flotage accordingly stratifies at or near the surface, and the wettable granules travel along the bottom. Splitter 20 divides the freely falling stream discharged from the outlet of the separator and directs the upper flotage to chamber 22, and the lower waste to chamber 26. The valuable phosphate is collected from outlet 24 of chamber 22 and the waste is collected and disposed of by means of outlets 28 of chamber 26.

The concentrate, however, is not completely clean and still contains a slight quartz contamination. After the concentrate is washed with acid, it is reagentized with an amine and run again through the illustrated separating apparatus. Since the phosphate is wet by the amine and the quartz is not, the phosphate this time forms the lower stratum which is collected from outlet 28, and the quartz floats on top and is collected from outlet 24. This illustrates how the same apparatus may be used for separating mixtures where either the floatable or non-floatable particles are more valuable, or even where both are to be simultaneously collected.

What is claimed is:

1. A method of separating a reagentized granular mixture into its constituent components which comprises the steps of flowing a liquid slurry incorporating said reagentized mixture under atmospheric tranquil laminar conditions, guiding said slurry to flow in a downwardly sloping and converging stream of increasing depth under tranquil laminar conditions of open-channel type flow without sandbarring and substantially increasing its velocity to segregate said constituents into strata within said stream, passing fine bubbles of a gaseous fluid through said slurry without disturbing said tranquil laminar conditions of open-channel flow during a preliminary portion of said flow of said slurry in said downwardly sloping and converging stream of open-channel type flow, cutting off said passage of bubbles through said slurry as said stream flows in the final portion of its open-channel type flow, the downward slope of said stream being made sufficient in angle and being maintained free of external interference to cause all surfaces of said stream to slope downwardly, discharging said stratified slurry from its condition of open-channel type flow in a freely falling stream, and smoothly dividing said freely falling stream into separated streams in accordance with said stratification after said freely falling stream has dropped a sufficient distance from said open-channel condition of flow to avoid the creation of any obstruction or interference with said open-channel condition of flow.

2. An apparatus for separating a reagentized granular slurry into its constituent components comprising a convergent trough having raised side walls which converge from its feed end to its outlet end, atmospheric-pressure feed means operatively associated with said feed end for providing a tranquil flow of said slurry to said convergent trough, the floor at said feed end of said convergent trough being finely perforated and the floor at said outlet end being substantially unbroken, pressurized chamber means attached to said finely perforated portion of said floor of said convergent trough for providing a flow of gaseous fluid which passes in the form of fine bubbles through said slurry without disturbing said tranquil flow, said convergent trough having a flat bottom with an inclination to the horizontal for cooperating with said raised converging side walls to guide said slurry to flow in a downwardly sloping stream of increasing depth under tranquil laminar conditions of flow without sandbarring while substantially increasing its velocity to segregate said constituents into strata within said stream, sharp-edged flow dividing means disposed a short distance from and across the width of said outlet end of said trough and within said stream which discharges freely from said outlet end to divide said stream into separate streams in accordance with said strata, and the upper surface of said slurry flowing through said convergent trough being maintained free of obstruction to prevent interference with said tranquil flow of slurry within said trough.

3. A structure for a slurry separating apparatus comprising a spoke-like array of convergent troughs as set forth in claim 2 which slope down and radially inward to a common outlet circle, said structure comprising means for supporting the outer inlet ends of said convergent troughs in a substantially circular array, a relatively smaller diameter circular support means concentrically disposed a predetermined distance below said circular array of inlet ends for supporting the outlet ends of said convergent troughs, an L-shaped annular trough which is proportioned to receive within it said circular array of inlet ends of said convergent troughs, said annular trough having a finely perforated inclined floor forming the inlet portion of the flat bottom of said convergent troughs, an annular pressurized chamber means secured to said inclined floor of said annular trough for providing a supply of a gaseous fluid therethrough, and atmospheric-pressure feed means operatively associated with said annular trough for providing a tranquil flow of slurry thereto.

4. An apparatus as set forth in claim 2 wherein said convergent trough converges from its inlet to its outlet at an included angle between 6° to 16°.

5. An apparatus as set forth in claim 2 wherein said convergent trough has an outlet width of between ⅜" to 1".

6. An apparatus as set forth in claim 2 wherein said convergent trough slopes downwardly at an angle between 9° and 14°.

References Cited in the file of this patent
UNITED STATES PATENTS

| | | |
|---|---|---|
| 1,269,150 | Armstrong | June 11, 1918 |
| 1,366,766 | Callow | Jan. 25, 1921 |
| 2,267,496 | Ellis | Dec. 23, 1941 |
| 2,646,882 | Frost | July 28, 1953 |
| 2,660,305 | Labouygues | Nov. 24, 1953 |
| 2,766,882 | Cannon | Oct. 16, 1956 |